(12) United States Patent
Dhanekula et al.

(10) Patent No.: US 7,725,285 B2
(45) Date of Patent: May 25, 2010

(54) METHOD AND APPARATUS FOR DETERMINING WHETHER COMPONENTS ARE NOT PRESENT IN A COMPUTER SYSTEM

(75) Inventors: Ramakrishna C. Dhanekula, San Diego, CA (US); Kenny C. Gross, San Diego, CA (US); Kalyanaraman Vaidyanathan, San Diego, CA (US); Glenn A. Herdeg, Acton, MA (US)

(73) Assignee: Oracle America, Inc., Redwood Shores, CA (US)

( * ) Notice: Subject to any disclaimer, the term of this patent is extended or adjusted under 35 U.S.C. 154(b) by 119 days.

(21) Appl. No.: 11/964,540

(22) Filed: Dec. 26, 2007

(65) Prior Publication Data

US 2009/0171612 A1  Jul. 2, 2009

(51) Int. Cl.
*G06F 11/22* (2006.01)
*G06F 17/40* (2006.01)

(52) U.S. Cl. .............. 702/130; 702/136; 702/186; 714/25

(58) Field of Classification Search ............ 702/130, 702/136, 186
See application file for complete search history.

(56) References Cited

U.S. PATENT DOCUMENTS

| 5,862,333 A * | 1/1999 | Graf ........................ 709/223 |
| 7,349,828 B1 * | 3/2008 | Ranganathan et al. ....... 702/186 |
| 2008/0004837 A1 * | 1/2008 | Zwinger et al. ............. 702/182 |

OTHER PUBLICATIONS

Gribok, Andrei V. et al., "Use of Kernel Based Techniques for Sensor Validation in Nuclear Power Plants", International Topical Meeting on Nuclear Communication, Controls, and Human-Machine Interface Technologies, Washington D.C., Nov. 2000.

* cited by examiner

*Primary Examiner*—Hal D Wachsman
(74) *Attorney, Agent, or Firm*—Park, Vaughan & Fleming LLP (57) ABSTRACT

A system that determines whether components are not present in a computer system is presented. During operation the system receives telemetry signals from sensors within the computer system. Next, the system dynamically generates a temperature map for the computer system based on the telemetry signals. The system then analyzes the temperature map to determine whether components are not present in the computer system.

27 Claims, 9 Drawing Sheets

METHOD AND APPARATUS FOR DETERMINING WHETHER COMPONENTS ARE NOT PRESENT IN A COMPUTER SYSTEM

BACKGROUND

1. Field of the Invention

The present invention relates to techniques for monitoring the health of a computer system. More specifically, the present invention relates to a method and apparatus for determining whether components are not present in a computer system.

2. Related Art

As datacenters grow to include larger numbers of computer systems, maintaining the reliability of these computer systems is becoming an increasingly challenging task. One challenge is to ensure that "filler modules" are properly installed in the computer system to fill the empty slots that are created when field-replaceable units (FRUs) are removed from the computer system. When filler modules (which are supposed to occupy empty slots in the computer system) are not present within the computer system, the cooling air flow within the computer system can generate parasitic eddies and the temperature of the system boards adjacent to the missing filler modules can increase. This decreases the long-term reliability of the system and can also trigger temperature alarm events that can cause the computer system to shut down.

This problem can arise because service engineers, who are under pressure to swap FRUs to stabilize a malfunctioning system as soon as possible, can forget to install filler modules into empty slots within the computer system. In other cases, a computer system might be shipped without installing the filler modules into empty slots within the computer system.

One solution to this problem is to design filler modules with electronic switches so that the computer system does not boot up if the filler modules are not installed in empty slots within the computer system. Unfortunately, this solution requires extra pins and extra circuitry in the computer systems, which adds complexity and cost to the computer system, and creates new failure modes.

Hence, what is needed is a method and an apparatus for determining whether components are not present in the computer system without the problems described above.

SUMMARY

Some embodiments of the present invention provide a system that determines whether components are not present in a computer system. During operation the system receives telemetry signals from sensors within the computer system. Next, the system dynamically generates a temperature map for the computer system based on the telemetry signals. The system then analyzes the temperature map to determine whether components are not present in the computer system.

In some embodiments, while analyzing the temperature map to determine whether components are not present in the computer system, the system compares the temperature map with a library of temperature maps to determine whether the temperature map substantially matches a temperature map in the library. Each temperature map within the library is generated during operation of a unique configuration of the computer system which includes a specified set of components that are present and that are not present in the computer system. If the temperature map substantially matches a temperature map in the library, the system determines that corresponding components are not present in the computer system.

In some embodiments, while determining whether the temperature map substantially matches a temperature map from the library, the system uses a pattern-recognition technique.

In some embodiments, prior to comparing the temperature map with the library of temperature maps, the system generates the library of temperature maps. This involves generating temperature maps for a set of unique configurations for the computer system, wherein each unique configuration includes a unique subset of components that are present and that are not present in the computer system. The system then saves the generated temperature maps into the library.

In some embodiments, the system identifies the components that are not present by identifying the components that were not present when the matching temperature map from the library was generated.

In some embodiments, the temperature map is a three-dimensional (3D) residual surface. In these embodiments, while dynamically generating the 3D residual surface, for each temperature sensor within the computer system, the system: (1) calculates the difference between the temperature measured by the temperature sensor when the computer system is executing a specified load and when the computer system is idle; (2) identifies a location of the temperature sensor within the computer system; and (3) associates the location of the temperature sensor with the calculated difference to generate a value for a coordinate on the 3D residual surface which corresponds to the location of the temperature sensor. The system then interpolates values between coordinates associated with the calculated differences to generate the 3D residual surface.

In some embodiments, the temperature map is a 3D residual surface. While dynamically generating the 3D residual surface, for each temperature sensor within the computer system, the system: (1) calculates the difference between the temperature measured by the temperature sensor and the ambient temperature when the computer system is executing a specified load to produce a first residual; (2) calculates the difference between the temperature measured by the temperature sensor and the ambient temperature when the computer system is idle to produce a second residual; (3) calculates the difference between the first residual and the second residual to produce a difference of residuals; (4) identifies a location of the temperature sensor within the computer system; and (5) associates the location of the temperature sensor with the calculated difference of residuals to generate a value for a coordinate on the 3D residual surface which corresponds to the location of the temperature sensor. The system then interpolates values between coordinates associated with the calculated differences of residuals to generate the 3D residual surface.

In some embodiments, the telemetry signals include signals from one or more of: hardware sensors; and software sensors.

In some embodiments, signals from the hardware sensors include one or more of: voltage; current; temperature; vibration; and fan speed.

In some embodiments, signals from the software sensors include one or more of: throughput; transaction latencies; queue lengths; central processing unit load; memory load; cache load; I/O traffic; bus saturation metrics; FIFO overflow statistics; and disk-related metrics.

In some embodiments, if components are determined to be not present in the computer system, the system performs a remedial action.

In some embodiments, the process is performed during a power-on self-test (POST) operation for the computer system.

In some embodiments, the components include filler modules which are used to fill empty slots of the computer system when field replaceable units (FRUs) are not present in the slots for the computer system.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other device capable of storing computer-readable media.

Computer System

Figure 1A:
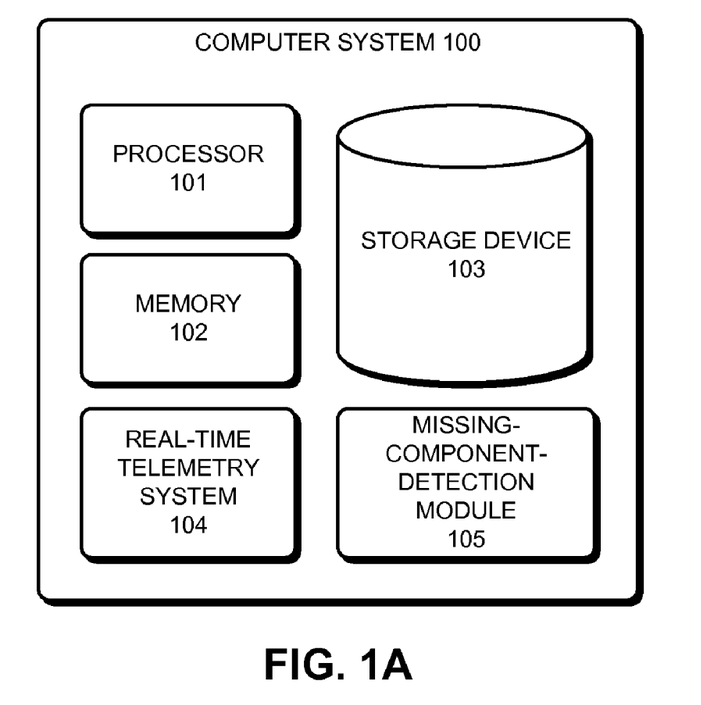
FIG. 1A presents a block diagram illustrating a computer system in accordance with an embodiment of the present invention.

FIG. 1A presents a block diagram illustrating a computer system 100 in accordance with an embodiment of the present invention. Computer system 100 includes processor 101, memory 102, storage device 103, real-time telemetry system 104, and missing-component-detection module 105.

Processor 101 can generally include any type of processor, including, but not limited to, a microprocessor, a mainframe computer, a digital signal processor, a personal organizer, a device controller and a computational engine within an appliance. Memory 102 can include any type of memory, including but not limited to, dynamic random access memory (DRAM), static random access memory (SRAM), flash memory, read only memory (ROM), and any other type of memory. Storage device 103 can include any type of non-volatile storage device that can be coupled to a computer system. This includes, but is not limited to, magnetic, optical, and magneto-optical storage devices, as well as storage devices based on flash memory and/or battery-backed up memory.

In some embodiments of the present invention, real-time telemetry system 104 is separate from computer system 100. Note that real-time telemetry system 104 is described in more detail below with reference to FIG. 12.

In some embodiments of the present invention, missing-component-detection module 105 is separate from computer system 100. Note that missing-component-detection module 105 is described in more detail below with reference to FIGS. 1B to 8. In some embodiments, missing-component-detection module 105 is included in real-time telemetry system 104.

Figure 1B:
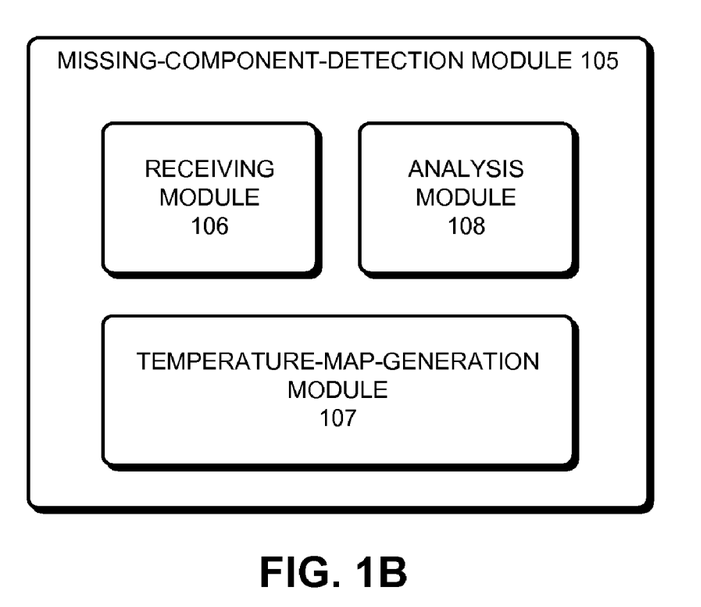
FIG. 1B presents a block diagram of a missing-component-detection module in accordance with an embodiment of the present invention.

FIG. 1B presents a block diagram of a missing-component-detection module 105 in accordance with an embodiment of the present invention. Missing-component-detection module 105 includes receiving module 106, temperature-map-generation module 107, and analysis module 108. Receiving module 106 is configured to receive telemetry signals from sensors within the computer system. For example, receiving module 106 can receive telemetry signals from a telemetry harness, which in turn can be part of real-time telemetry system 104. Temperature-map-generation module 107 is configured to dynamically generate a temperature map for the computer system based on the telemetry signals. Analysis module 108 is configured to analyze the temperature map to determine whether components within the computer system are not present.

Determining Whether Components are not Present

Modern computer systems typically include hardware and/or software sensors that can be periodically polled using a telemetry harness to generate time-series telemetry data. The time-series telemetry data collected using a telemetry harness can be used, for example, to determine the onset of failure for components within the computer system, to monitor the performance of the computer system, and to estimate the power consumed by the computer system in real time. Hence, some embodiments of the present invention use real-time temperature time-series data collected through a telemetry harness (or a real-time telemetry system) to generate dynamic 3D temperature profiles in real-time. When the dynamic 3D "thermal surface" is generated in real time, holes can be seen in the 3D surface where the components (e.g., filler modules) are not present. The temperatures downstream (relative to the air inlet into which the computer system receives cool air) of the holes are different when components are present within the computer system in comparison to when components are not present.

In some embodiments, a pattern-recognition technique is used to compare a real-time 3D thermal surface with 3D thermal surfaces stored in a library of 3D thermal surfaces, wherein the library includes different permutations of components present and components not present within the computer system. To reduce the effects of variations in ambient inlet temperatures, some embodiments of the present invention generate the 3D thermal surfaces from "residuals" (difference between internal temperatures and ambient temperatures). To reduce the effects of end-user load dynamics, some embodiments of the present invention are performed for a specified amount of time (e.g., 5-10 seconds) during a power-on self-test (POST) operation. In these embodiments, readings can be taken at idle load and at full load (or a specified load).

Figure 2:
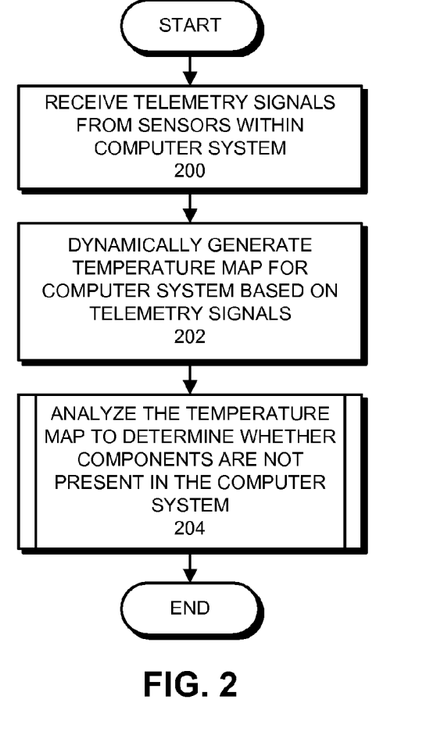
FIG. 2 presents a flowchart illustrating a process for determining whether components are not present in a computer system in accordance with an embodiment of the present invention.

FIG. 2 presents a flowchart illustrating a process for determining whether components within a computer system are not present in accordance with an embodiment of the present invention. The process begins when the system receives telemetry signals from sensors within the computer system (step 200). Next, the system dynamically generates a temperature map for the computer system based on the telemetry signals (step 202). The system then analyzes the temperature map to determine whether components are not present in the computer system (step 204). Note that step 204 is described in more detail with reference to FIG. 3 below.

Figure 3:
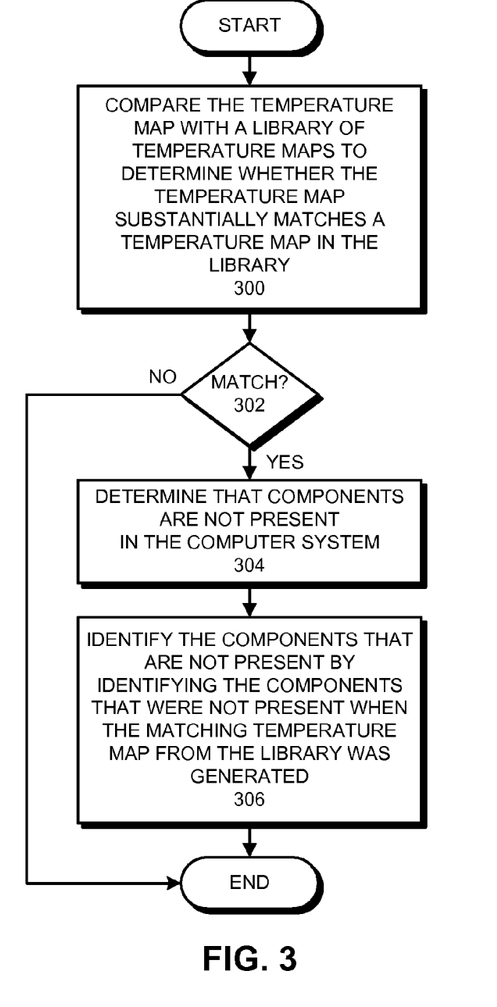
FIG. 3 presents a flowchart illustrating the process for analyzing the temperature map to determine whether components are not present in the computer system accordance with an embodiment of the present invention.

FIG. 3 presents a flowchart illustrating a process for analyzing the temperature map to determine whether components are not present in the computer system in accordance with an embodiment of the present invention. The process begins when the system compares the temperature map with a library of temperature maps to determine whether the temperature map substantially matches a temperature map in the library (step 300). Each temperature map within the library is generated during operation of a unique configuration of the computer system which includes a specified set of components that are present and that are not present within the computer system. In some embodiments, the system uses a pattern-recognition technique to determine whether the temperature map substantially matches a temperature map from the library. If the temperature map substantially matches a temperature map in the library (step 302, yes), the system determines that components are not present in the computer system (step 304). Next, the system identifies the components that are not present by identifying the components that were not present when the matching temperature map from the library was generated (step 306).

Figure 4:
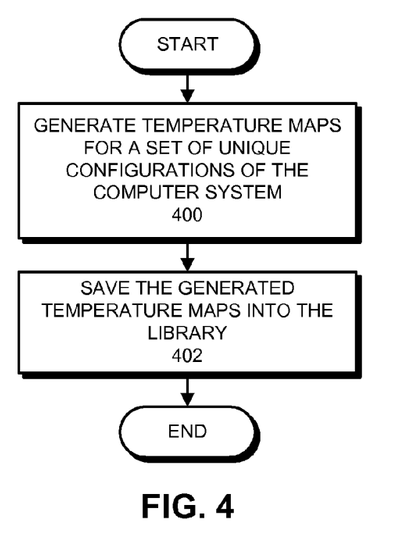
FIG. 4 presents a flowchart illustrating the process for generating a library of temperature maps for a computer system in accordance with an embodiment of the present invention.

FIG. 4 presents a flowchart illustrating a process for generating a library of temperature maps for a computer system in accordance with an embodiment of the present invention. The process begins when the system generates temperature maps for a set of unique configurations for the computer system (step 400), wherein each unique configuration includes a unique subset of components that are present and that are not present within the computer system. The system then saves the generated temperature maps into the library (step 402). In some embodiments, the process illustrated in FIG. 4 is performed during a training phase. For example, for a given computer system (e.g., with specified air flow characteristics, specified component locations, etc.), the temperature map is generated for different configurations of components that are present and that are not present within the computer system.

Figure 5:
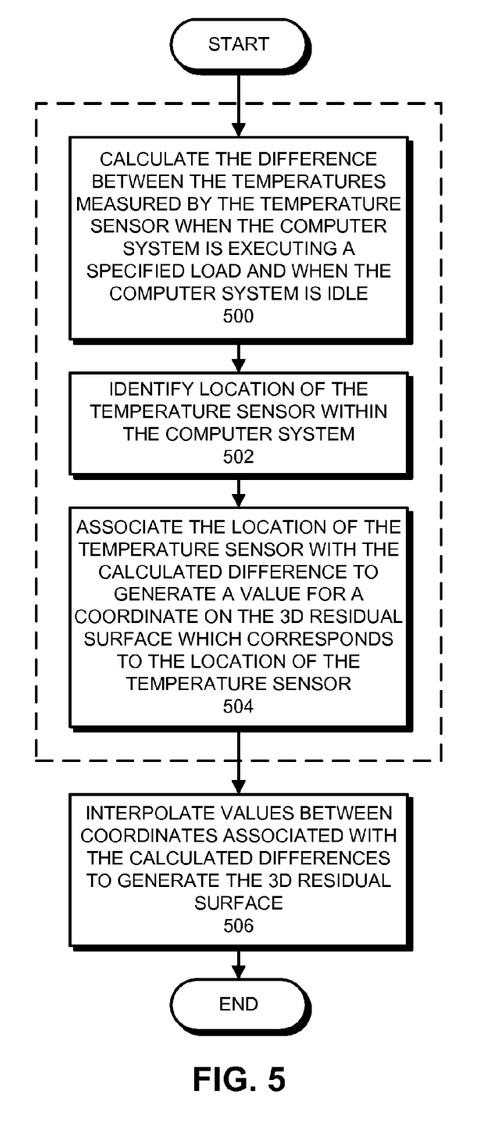
FIG. 5 presents a flowchart illustrating the process for generating a 3D residual surface for the computer system in accordance with an embodiment of the present invention.
Figure 6:
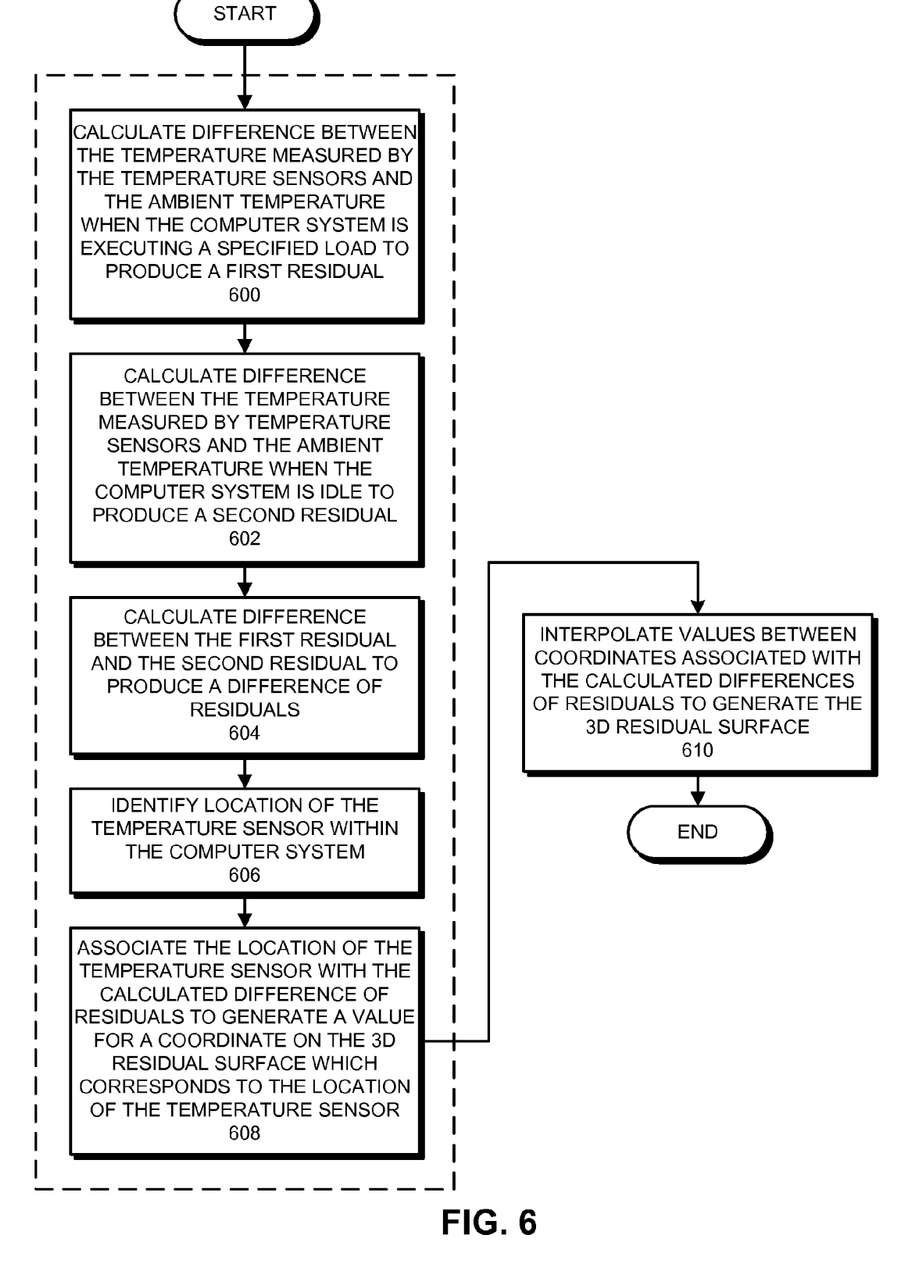
FIG. 6 presents a flowchart illustrating another process for generating a 3D residual surface for the computer system in accordance with an embodiment of the present invention.

In some embodiments, the temperature map is a 3D residual surface. FIGS. 5-6 describe these embodiments in more detail.

FIG. 5 presents a flowchart illustrating a process for generating a 3D residual surface for the computer system in accordance with an embodiment of the present invention. Note that the system performs steps 500-504 for each temperature sensor within the computer system. During this process, the system calculates the difference between the temperatures measured by the temperature sensor when the computer system is executing a specified load and when the computer system is idle (step 500). For example, the specified load can be a load which uses all resources within the computer system at a 100% utilization rate. Similarly, the specified load can be a load which uses a subset of the resources within the computer system at a specified utilization rate. Note that when the computer system is idle, the computer system is typically waiting for useful work to be executed (e.g., waiting for a user to open an application) or waiting for user input. Some embodiments of the present invention calculate the difference between the temperature measured by the temperature sensor when the computer system is executing a first specified load and the temperature measured by the temperature sensor when the computer system is executing a second specified load (which is different than the first specified load).

The system then identifies a location of the temperature sensor within the computer system (step 502). Next, the system associates the location of the temperature sensor with the calculated difference to generate a value for a coordinate on the 3D residual surface which corresponds to the location of the temperature sensor (step 504). The system then interpolates values between coordinates associated with the calculated differences to generate the 3D residual surface (step 506).

FIG. 6 presents a flowchart illustrating another process for generating a 3D residual surface for the computer system in accordance with an embodiment of the present invention. Note that the system performs steps 600-608 for each temperature sensor within the computer system. During this process, the system calculates the difference between the temperature measured by the temperature sensors and the ambient temperature when the computer system is executing a specified load to produce a first residual (step 600). Note that the specified load is described above with reference to FIG. 5. The system then calculates the difference between the temperature measured by temperature sensors and the ambient temperature when the computer system is idle to produce a second residual (step 602). Note that an idle computer system is described above with reference to FIG. 5. In some embodiments, the system can calculate the difference between the temperature measured by temperature sensors and the ambient temperature when the computer system is executing a second specified load.

Next, the system calculates the difference between the first residual and the second residual to produce a difference of residuals (step 604). The system then identifies a location of the temperature sensor within the computer system (step 606). Next, the system associates the location of the temperature sensor with the calculated difference of residuals to generate a value for a coordinate on the 3D residual surface which corresponds to the location of the temperature sensor (step 608). The system then interpolates values between coordinates associated with the calculated differences of residuals to generate the 3D residual surface (step 610).

In some embodiments, if components are determined to be not present in the computer system, the system performs a remedial action. In some embodiments, the remedial action can include, but is not limited to, generating a warning that components within the computer system are not present, notifying a system administrator, shutting down the computer system, and replacing the missing components.

Exemplary Implementation

In some embodiments, the process of determining whether components are not present in the computer system is divided into two phases: (1) a training phase and (2) a monitoring phase.

Figure 7:
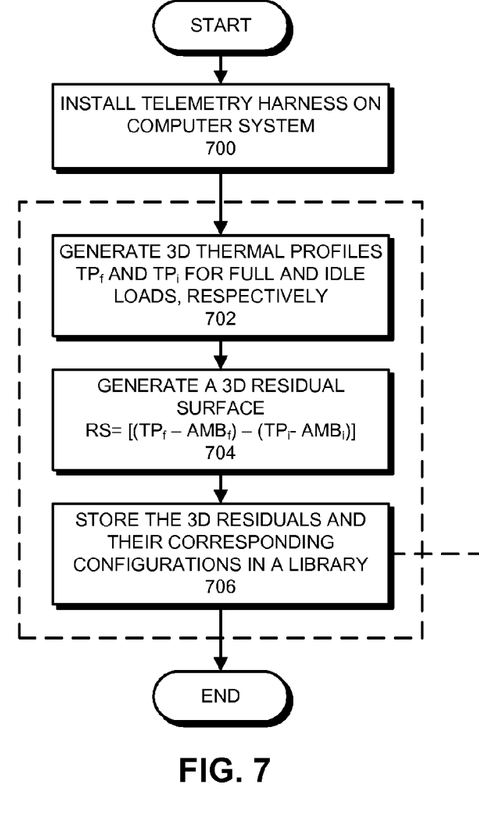
FIG. 7 presents a flowchart illustrating operations performed during an exemplary training phase in accordance with an embodiment of the present invention.

FIG. 7 presents a flowchart illustrating operations performed during an exemplary training phase in accordance with an embodiment of the present invention. The process begins when the system installs a telemetry harness on the computer system (step 700). For example, the telemetry harness can be part of a real-time telemetry system. Note that the system performs steps 702-706 for a number of permutations of components present and components not present within the computer system. The system then generates 3D thermal profiles $TP_f$ and $TP_i$ for full and idle loads, respectively, (step 702) for a given permutation. Next, the system generates a 3D residual surface $RS=[(TP_f-AMB_f)-(TP_i-AMB_i)]$ (step 704) for the given permutation, where $AMB_f$ and $AMB_i$ are the ambient temperatures when the load is full and idle, respectively. In some embodiments, interpolation is used to generate smooth surfaces from the time-series telemetry data. The system then stores the 3D residuals and their corresponding configurations for the given permutation in a library (step 706). In some embodiments, the configuration file includes a list of components not present during a particular test.

Figure 8:
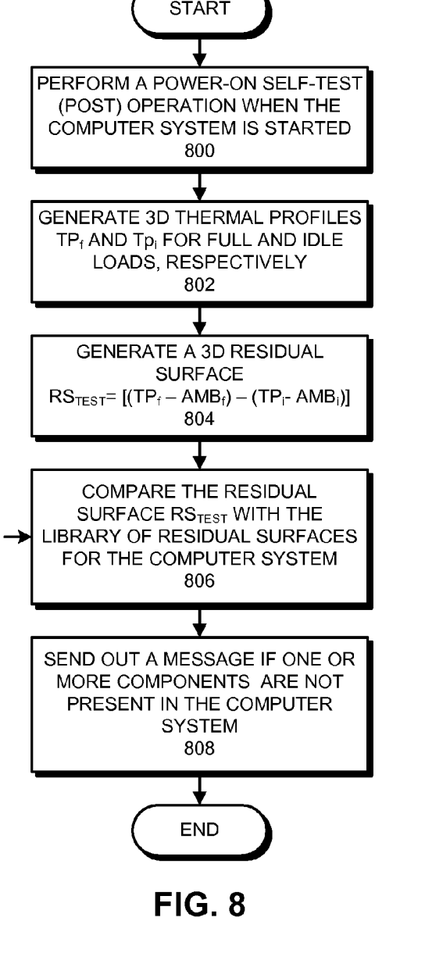
FIG. 8 presents a flowchart illustrating operations performed during an exemplary monitoring phase in accordance with an embodiment of the present invention.

FIG. 8 presents a flowchart illustrating operations performed during an exemplary monitoring phase in accordance with an embodiment of the present invention. The process begins when the system performs a power-on self-test (POST) operation when the system is started (step 800). Next, the system generates 3D thermal profiles $TP_f$ and $TP_i$ for full and idle loads, respectively (step 802). The system then generates a 3D residual surface $RS_{TEST}=[(TP_f-AMB_f)-(TP_i-AMB_i)]$ (step 804). Next, the system compares the residual surface $RS_{TEST}$ with the library of residual surfaces for the computer system (step 806) to determine whether $RS_{TEST}$ substantially matches a residual surface in the library. If $RS_{TEST}$ substantially matches a residual surface in the library, the system determines that one or more components are not present in the computer system. Note that the library was generated during the training phase in step 706. The system then sends out a message if one or more components are not present in the computer system (step 808) (i.e., if $RS_{TEST}$ substantially matches a residual surface in the library). The computer system then exits the POST operation.

Figure 9:
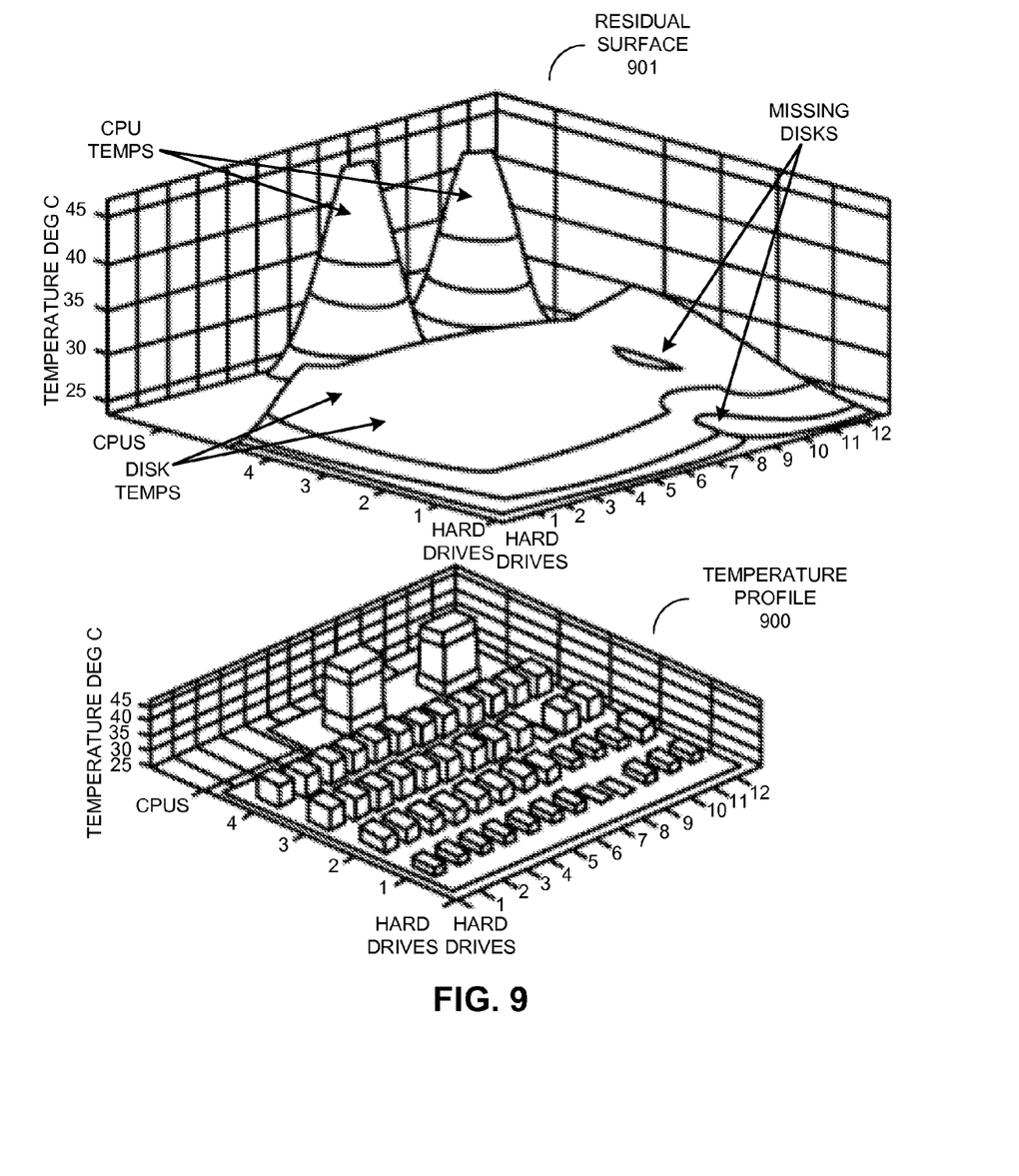
FIG. 9 presents exemplary temperature profiles and residual surfaces for a computer system in accordance with an embodiment of the present invention.

FIG. 9 presents exemplary temperature profile 900 and residual surface 901 for a computer system in accordance with an embodiment of the present invention. In FIG. 9, a number of disk drives are not present in the computer system. Furthermore, filler modules are not present at those locations. As illustrated in FIG. 9, the missing disk drives (and nonexistent filler modules) can be identified as holes in residual surface 901 (or areas of uneven temperature in temperature profile 900). Note that exemplary temperature profile 900 and residual surface 901 were generated when all disk drives within the computer system were reading and idling with a cycle period of 1 hour.

Figure 10:
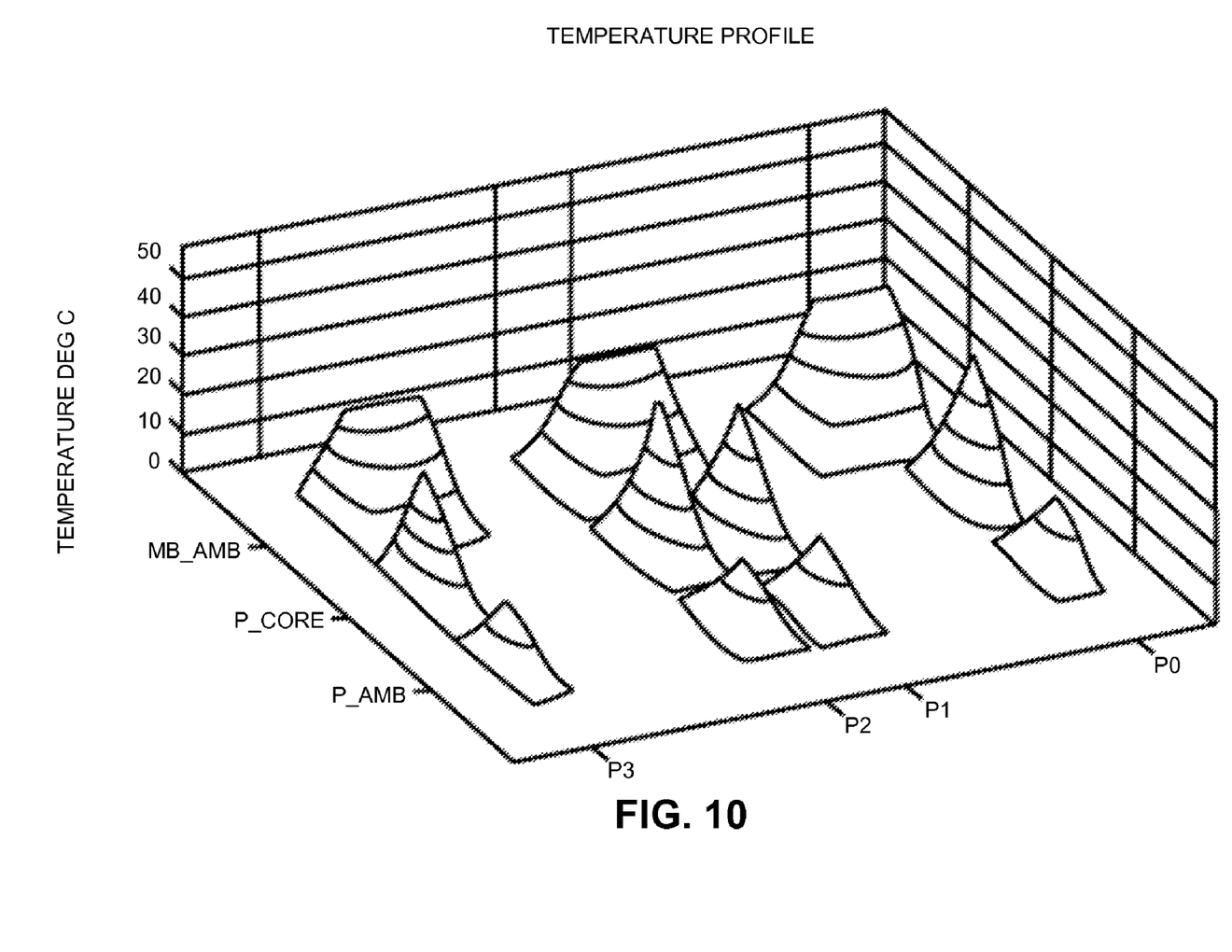
FIG. 10 presents another exemplary residual surface for a computer system in accordance with an embodiment of the present invention.
Figure 11:
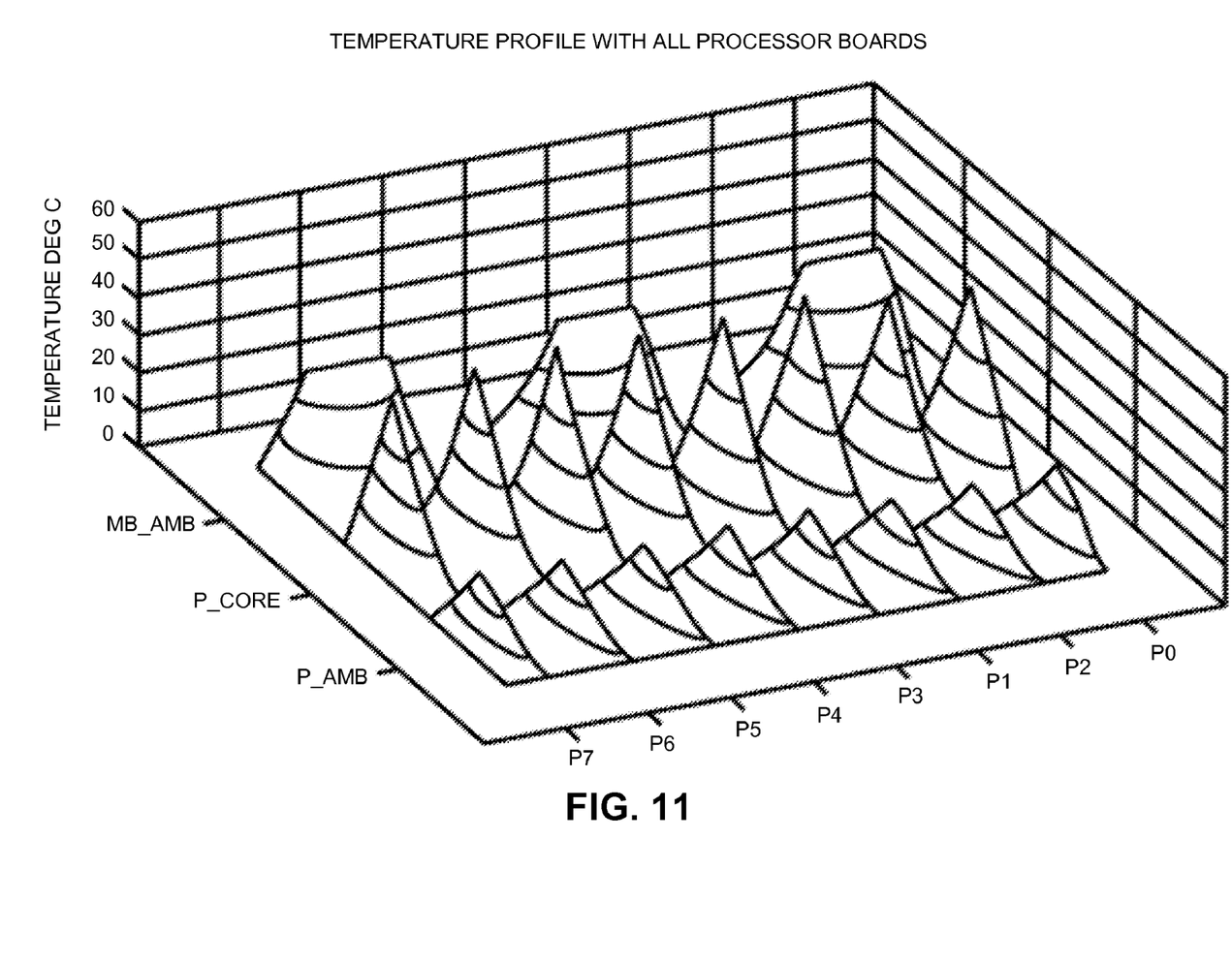
FIG. 11 presents an exemplary residual surface for a computer system in accordance with an embodiment of the present invention.

FIG. 10 presents an exemplary residual surface for a computer system wherein a number of processor boards are not present within the computer system in accordance with an embodiment of the present invention. In FIG. 10, Px indicates a processor board x within the computer system, MB_AMB indicates the ambient temperature of the computer system as measured by sensors at specified locations on the motherboard, P_CORE indicates the temperature of a processor as measured by a sensor on the processor, and P_AMB indicates the ambient temperature of the computer system as measured by a temperature sensor at a specified distance from a given processor within the computer system. Note that all three surfaces (MB_AMB, P_CORE, and P_AMB) generated from the three different types of temperature sensors indicate the location of processor boards not present within the computer system. FIG. 10 can be contrasted with FIG. 11, which illustrates an exemplary residual surface for the computer system when all processor boards are present (see FIG. 11).

Real-Time Telemetry System

Figure 12:
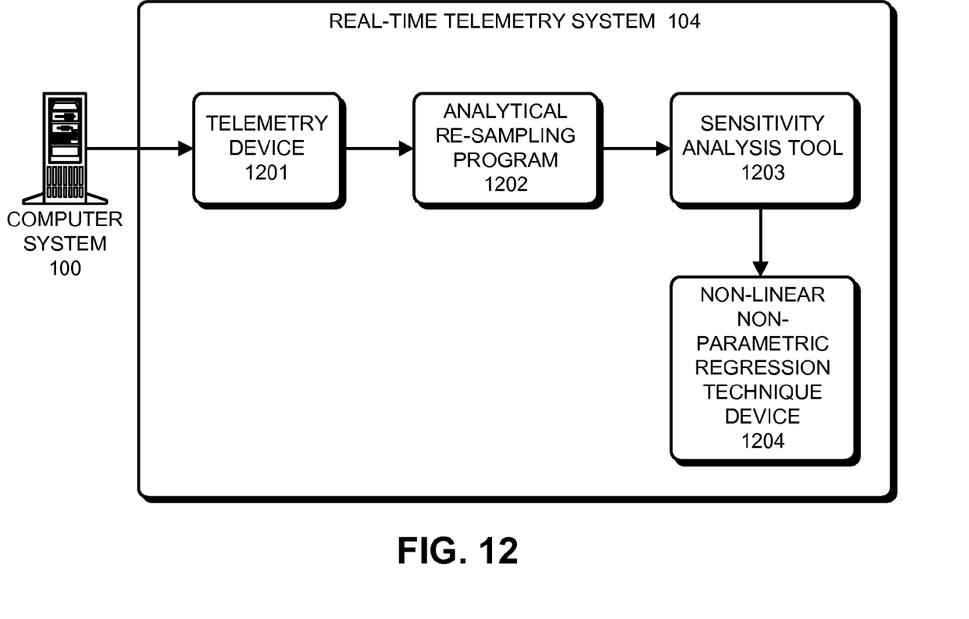
FIG. 12 presents a block diagram of a real-time telemetry system which monitors a computer system in accordance with an embodiment of the present invention.

FIG. 12 presents a block diagram of a real-time telemetry system 104 which monitors computer system 100 in accordance with an embodiment of the present invention. Real-time telemetry system 104 includes telemetry device 1201, analytical re-sampling program 1202, sensitivity analysis tool 1203, and non-linear, non-parametric (NLNP) regression technique device 1204. Telemetry device 1201 gathers information from the various sensors and monitoring tools within computer system 100, and directs the signals to local or remote locations that include analytical re-sampling program 1202, sensitivity analysis tool 1203, and NLNP regression technique device 1204. In one embodiment of the present invention, analytical re-sampling program 1202, sensitivity analysis tool 1203, and NLNP regression technique device 1204 are located within computer system 100. In another embodiment of the present invention, analytical re-sampling program 1202, sensitivity analysis tool 1203, and NLNP regression technique device 1204 are located on a plurality of computer systems including computer system 100 and other remote computer systems.

The analytical re-sampling program 1202 ensures that the signals have a uniform sampling rate. In doing so, analytical re-sampling program 1202 uses interpolation techniques, if necessary, to fill in missing data points, or to equalize the sampling intervals when the raw data is non-uniformly sampled.

After the signals pass through analytical re-sampling program 1202, they are aligned and correlated by sensitivity analysis tool 1203. For example, in some embodiments of the present invention, sensitivity analysis tool 1203 incorporates a novel moving window technique that "slides" through the signals with systematically varying window widths. The sliding windows systematically vary the alignment between windows for different signals to optimize the degree of association between the signals, as quantified by an "F-statistic," which is computed and ranked for all signal windows by sensitivity analysis tool 1203.

For statistically comparing the quality of two fits, F-statistics reveal the measure of regression. The higher the value of the F-statistic, the better the correlation is between two signals. The lead/lag value for the sliding window that results in the F-statistic with the highest value is chosen, and the candidate signal is aligned to maximize this value. This process is repeated for each signal by sensitivity analysis tool 1203.

Signals that have an F-statistic very close to 1 are "completely correlated" and can be discarded. This can result when two signals are measuring the same metric, but are expressing them in different engineering units. For example, a signal can convey a temperature in degrees Fahrenheit, while a second signal conveys the same temperature in degrees Centigrade.

Since these two signals are perfectly correlated, one does not include any additional information over the other, and therefore, one may be discarded.

Some signals may exhibit little correlation, or no correlation whatsoever. In this case, these signals may be dropped as they add little predictive value. Once a highly correlated subset of the signals has been determined, they are combined into one group or cluster for processing by the NLNP regression technique device 1204.

Non-Linear, Non-Parametric Regression

In some embodiments of the present invention, the NLNP regression technique is a multivariate state estimation technique (MSET). The term "MSET" as used in this specification refers to a class of pattern recognition algorithms. For example, see [Gribok] "Use of Kernel Based Techniques for Sensor Validation in Nuclear Power Plants," by Andrei V. Gribok, J. Wesley Hines, and Robert E. Uhrig, *The Third American Nuclear Society International Topical Meeting on Nuclear Plant Instrumentation and Control and Human-Machine Interface Technologies*, Washington D.C., Nov. 13-17, 2000. This paper outlines several different pattern recognition approaches. Hence, the term "MSET" as used in this specification can refer to (among other things) any technique outlined in [Gribok], including Ordinary Least Squares (OLS), Support Vector Machines (SVM), Artificial Neural Networks (ANNs), MSET, or Regularized MSET (RMSET).

Some embodiments of the present invention use an advanced pattern recognition approach, which takes data gathered from software variables reported by the operating system, hardware variables generated by the sensors in the computer system, and a model of a properly-functioning disk drive which is generated during a training phase, to determine whether a disk drive is at the onset of degradation.

Some embodiments of the present invention continuously monitor a variety of instrumentation signals in real time during operation of the server. (Note that although we refer to a single computer system in this disclosure, the present invention also applies to a collection of computer systems.)

These instrumentation signals can also include signals associated with internal performance parameters maintained by software within the computer system. For example, these internal performance parameters can include system throughput, transaction latencies, queue lengths, load on the central processing unit, load on the memory, load on the cache, I/O traffic, bus saturation metrics, FIFO overflow statistics, and various operational profiles gathered through "virtual sensors" located within the operating system.

These instrumentation signals can also include signals associated with canary performance parameters for synthetic user transactions, which are periodically generated for the purpose of measuring quality of service from the end user's perspective.

These instrumentation signals can additionally include hardware variables, including, but not limited to, internal temperatures, voltages, currents, and fan speeds.

Furthermore, these instrumentation signals can include disk-related metrics for storage devices such as disk drives, including, but not limited to, average service time, average response time, number of kilobytes (kB) read per second, number of kB written per second, number of read requests per second, number of write requests per second, and number of soft errors per second.

The foregoing instrumentation parameters are monitored continuously with an advanced statistical pattern recognition technique. Some embodiments of the present invention use a class of techniques known as non-linear, non-parametric (NLNP) regression techniques, such as the MSET. Alternatively, some embodiments of the present invention can use other pattern recognition techniques, such as neural networks or other types of NLNP regression. Other embodiments of the present invention use a linear regression technique. In each case, the pattern recognition module "learns" how the behavior of the monitored variables relates to a properly-functioning disk drive. The pattern recognition module then generates a model of the properly-functioning disk drive that is used to determine whether a disk drive is at the onset of degradation.

In some embodiments of the present invention, the system components from which the instrumentation signals originate are field replaceable units (FRUs), which can be independently monitored. Note that all major system units, including both hardware and software, can be decomposed into FRUs. (For example, a software FRU can include: an operating system, a middleware component, a database, or an application.)

Also note that these embodiments of the present invention are not meant to be limited to server computer systems. In general, these embodiments of the present invention can be applied to any type of computer system. This includes, but is not limited to, a computer system based on a microprocessor, a mainframe computer, a digital signal processor, a portable computing device, a personal organizer, a device controller, and a computational engine within an appliance.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for determining whether components are not present in a computer system, comprising:
   receiving telemetry signals from sensors within the computer system;
   dynamically generating a temperature map using a plurality of calculated temperature differences for the computer system based on the telemetry signals; and
   analyzing the temperature map to determine whether components are not present in the computer system by comparing said temperature map to one or more temperature maps from a library of temperature maps, wherein each temperature map in the library of temperature maps represents a unique configuration of a specified set of the components.

2. The method of claim 1, wherein each temperature map within the library is generated during operation of a unique configuration of the computer system which includes a specified set of components that are present and that are not present within the computer system, and wherein when analyzing the temperature map to determine whether components are not present in the computer system,
   if the temperature map substantially matches a temperature map in the library, the method further comprises determining that corresponding components are not present in the computer system.

3. The method of claim 2, wherein determining whether the temperature map substantially matches a temperature map from the library involves using a pattern-recognition technique.

4. The method of claim 2, wherein prior to comparing the temperature map with the library of temperature maps, the method further comprises generating the library of temperature maps by:

generating temperature maps for a set of unique configurations for the computer system, wherein each unique configuration includes a unique subset of components that are present and that are not present within the computer system; and saving the generated temperature maps into the library.

5. The method of claim 2, wherein after determining that components are not present in the computer system, the method further comprises identifying the components that are not present by identifying the components that were not present when the matching temperature map from the library was generated.

6. The method of claim 1, wherein the temperature map is a three dimensional (3D) residual surface, and wherein dynamically generating the 3D residual surface involves:

for each temperature sensor from the sensors within the computer system, calculating the difference between the temperatures measured by the temperature sensor when the computer system is executing a specified load and when the computer system is idle;

identifying a location of the temperature sensor within the computer system; and associating the location of the temperature sensor with the calculated difference to generate a value for a coordinate on the 3D residual surface which corresponds to the location of the temperature sensor; and interpolating values between coordinates associated with the calculated differences to generate the 3D residual surface.

7. The method of claim 1, wherein the temperature map is a three dimensional (3D) residual surface, and wherein dynamically generating the 3D residual surface involves:

for each temperature sensor from the sensors within the computer system, calculating the difference between the temperature measured by the temperature sensor and the ambient temperature when the computer system is executing a specified load to produce a first residual;

calculating the difference between the temperature measured by the temperature sensor and the ambient temperature when the computer system is idle to produce a second residual;

calculating the difference between the first residual and the second residual to produce a difference of residuals;

identifying a location of the temperature sensor within the computer system; and associating the location of the temperature sensor with the calculated difference of residuals to generate a value for a coordinate on the 3D residual surface which corresponds to the location of the temperature sensor; and interpolating values between coordinates associated with the calculated differences of residuals to generate the 3D residual surface.

8. The method of claim 1, wherein the telemetry signals include signals from one or more of:

hardware sensors; and
software sensors.

9. The method of claim 8, wherein signals from the hardware sensors include one or more of:

voltage;
current;
temperature;
vibration; and
fan speed.

10. The method of claim 8, wherein signals from the software sensors include one or more of:

throughput;
transaction latencies;
queue lengths;
central processing unit load;
memory load;
cache load;
I/O traffic;
bus saturation metrics;
FIFO overflow statistics; and
disk-related metrics.

11. The method of claim 1, wherein if components are determined to be not present in the computer system, the method further comprises performing a remedial action.

12. The method of claim 1, wherein the method is performed during a power-on self-test (POST) operation for the computer system.

13. The method of claim 1, wherein the components include filler modules which are used to fill empty slots of the computer system when field replaceable units (FRUs) are not present in slots for the computer system.

14. A computer-readable storage medium storing instructions that when executed by a computer cause the computer to perform a method for determining whether components are not present in a computer system, comprising:

receiving telemetry signals from sensors within the computer system;

dynamically generating a temperature map using a plurality of calculated temperature differences for the computer system based on the telemetry signals; and analyzing the temperature map to determine whether components are not present in the computer system by comparing said temperature map to one or more temperature maps from a library of temperature maps, wherein each temperature map in the library of temperature maps represents a unique configuration of a specified set of the components.

15. The computer-readable storage medium of claim 14, wherein each temperature map within the library is generated during operation of a unique configuration of the computer system which includes a specified set of components that are present and that are not present within the computer system, and wherein when analyzing the temperature map to determine whether components are not present in the computer system, if the temperature map substantially matches a temperature map in the library, the method further comprises determining that corresponding components are not present within the computer system.

16. The computer-readable storage medium of claim 15, wherein determining whether the temperature map substantially matches a temperature map from the library involves using a pattern-recognition technique.

17. The computer-readable storage medium of claim 15, wherein prior to comparing the temperature map with the library of temperature maps, the method further comprises generating the library of temperature maps by:

generating temperature maps for a set of unique configurations for the computer system, wherein each unique configuration includes a unique subset of components that are present and that are not present within the computer system; and saving the generated temperature maps into the library.

18. The computer-readable storage medium of claim 15, wherein after determining that components are not present in the computer system, the method further comprises identifying the components that are not present by identifying the components that were not present when the matching temperature map from the library was generated.

19. The computer-readable storage medium of claim 14, wherein the temperature map is a three dimensional (3D) residual surface, and wherein dynamically generating the 3D residual surface involves:
   for each temperature sensor from the sensors within the computer system,
   calculating the difference between the temperatures measured by the temperature sensor when the computer system is executing a specified load and when the computer system is idle;
   identifying a location of the temperature sensor within the computer system; and
   associating the location of the temperature sensor with the calculated difference to generate a value for a coordinate on the 3D residual surface which corresponds to the location of the temperature sensor; and
   interpolating values between coordinates associated with the calculated differences to generate the 3D residual surface.

20. The computer-readable storage medium of claim 14, wherein the temperature map is a three dimensional (3D) residual surface, and wherein dynamically generating the 3D residual surface involves:
   for each temperature sensor from the sensors within the computer system,
   calculating the difference between the temperature measured by the temperature sensor and the ambient temperature when the computer system is executing a specified load to produce a first residual;
   calculating the difference between the temperature measured by temperature sensor and the ambient temperature when the computer system is idle to produce a second residual;
   calculating the difference between the first residual and the second residual to produce a difference of residuals;
   identifying a location of the temperature sensor within the computer system; and
   associating the location of the temperature sensor with the calculated difference of residuals to generate a value for a coordinate on the 3D residual surface which corresponds to the location of the temperature sensor; and
   interpolating values between coordinates associated with the calculated differences of residuals to generate the 3D residual surface.

21. The computer-readable storage medium of claim 14, wherein the telemetry signals include signals from one or more of:
   hardware sensors; and
   software sensors.

22. The computer-readable storage medium of claim 21, wherein signals from the hardware sensors include one or more of:
   voltage;
   current;
   temperature;
   vibration; and
   fan speed.

23. The computer-readable storage medium of claim 21, wherein signals from the software sensors include one or more of:
   throughput;
   transaction latencies;
   queue lengths;
   central processing unit load;
   memory load;
   cache load;
   I/O traffic;
   bus saturation metrics;
   FIFO overflow statistics; and
   disk-related metrics.

24. The computer-readable storage medium of claim 14, wherein if components are determined to be not present in the computer system, the method further comprises performing a remedial action.

25. The computer-readable storage medium of claim 14, wherein the method is performed during a power-on self-test (POST) operation for the computer system.

26. The computer-readable storage medium of claim 14, wherein the components include filler modules which are used to fill empty slots of the computer system when field replaceable units (FRUs) are not present in slots for the computer system.

27. An apparatus that determines whether components are not present in a computer system, comprising:
   a receiving mechanism configured to receive telemetry signals from sensors within the computer system;
   a temperature-map generation mechanism configured to dynamically generate a temperature map using a plurality of calculated temperature differences for the computer system based on the telemetry signals; and
   an analysis mechanism configured to analyze the temperature map to determine whether components are not present in the computer system by comparing said temperature map to one or more temperature maps from a library of temperature maps, wherein each temperature map in the library of temperature maps represents a unique configuration of a specified set of the components.

* * * * *

UNITED STATES PATENT AND TRADEMARK OFFICE
CERTIFICATE OF CORRECTION

PATENT NO.        : 7,725,285 B2
APPLICATION NO.   : 11/964540
DATED             : May 25, 2010
INVENTOR(S)       : Ramakrishna C. Dhanekula et al.

Page 1 of 1

It is certified that error appears in the above-identified patent and that said Letters Patent is hereby corrected as shown below:

In column 12, line 24, in claim 13, delete "field replaceable" and insert -- field-replaceable --, therefor.

In column 12, line 33-34, in claim 26, delete "field replaceable" and insert -- field-replaceable --, therefor.

Signed and Sealed this
Nineteenth Day of July, 2011

David J. Kappos
*Director of the United States Patent and Trademark Office*